G. E. HASZINGER.
PUMP.
APPLICATION FILED SEPT. 6, 1919.

1,321,630.

Patented Nov. 11, 1919.

WITNESSES
E.A.Buchanan
C. E. Fraiser.

INVENTOR
G.E.Haszinger.
BY
ATTORNEYS

UNITED STATES PATENT OFFICE.

GEORGE ERNEST HASZINGER, OF GALVESTON, TEXAS.

PUMP.

1,321,630.  Specification of Letters Patent.  Patented Nov. 11, 1919.

Application filed September 6, 1919. Serial No. 322,091.

*To all whom it may concern:*

Be it known that I, GEORGE ERNEST HASZINGER, a citizen of the United States, and a resident of Galveston, in the county of Galveston and State of Texas, have invented certain new and useful Improvements in Pumps, of which the following is a specification.

My invention is an improvement in pumps, and has for its object the provision of a pump providing a counterbalance for the weight of the column of liquid in the suction pipe provided by a vacuum chamber in the pump.

Figure 1:
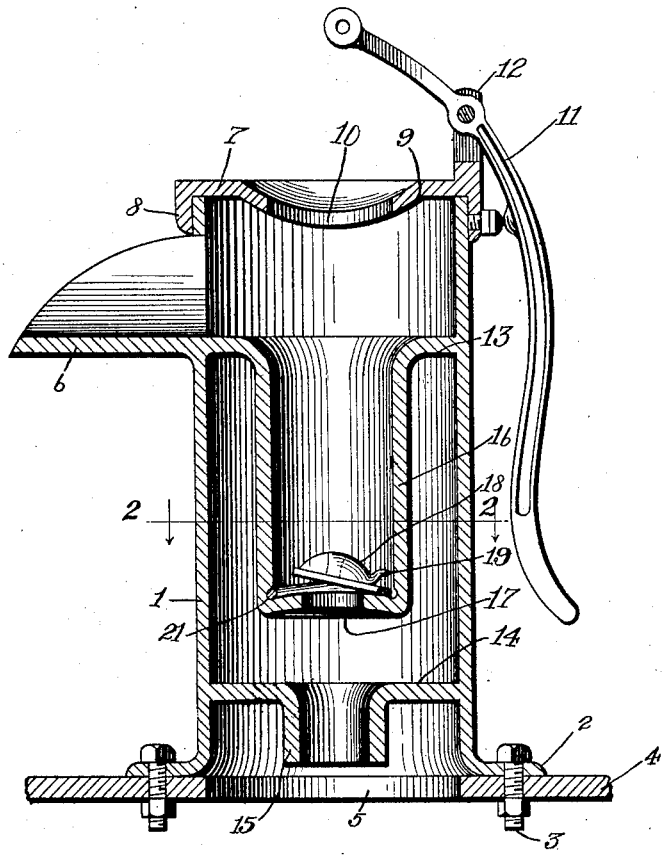
Figure 1 is a vertical section of the improved pump.
Figure 2:
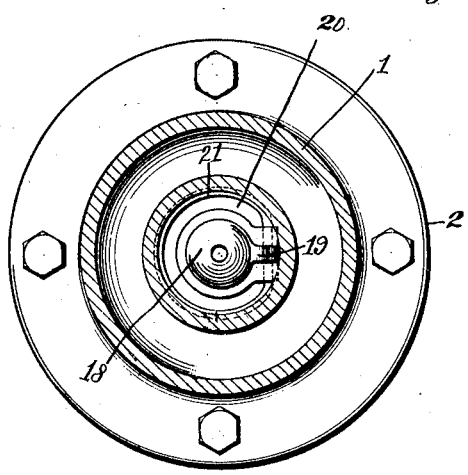
Fig. 2 is a section on the line 2—2 of Fig. 1.

In the present embodiment of the invention the pump casing 1, which is cylindrical and of usual construction, has the marginal flange 2 at its bottom which may be secured by bolts and nuts 3 to a cover plate 4 for the well, the said plate having an opening 5 registering with the bore of the casing 1. This casing has a lateral spout 6 near its upper end and a cover 7 is secured to the upper end of the casing about the spout, the cover having a depending marginal flange 8 fitting about the casing 1 and secured thereto in any suitable manner.

This cover 7 has a depressed portion 9 at its center and the said portion is provided with a slot 10 extending diametrically of the casing and adapted to permit the passage of the plunger rod which is connected with the handle 11 pivoted to lugs 12 extending upwardly from the cover in the usual manner.

The casing 1 is provided with a transverse partition 13 at the level of the bottom of the spout 6 and with a second transverse partition 14 near its bottom. The partition 14 has a depending central nipple 15 to which may be connected the suction pipe of the pump. The partition 13 has a downwardly offset portion at its center, forming a chamber coaxial with the casing 1 and spaced apart from the wall thereof, the said chamber being open at its top, that is, opening through the partition 13.

The lower end of the casing is partially closed to form a port 17 and a valve 18 co-operates with this port. This valve is normally held slightly open and is provided with a weight to make it fall quickly, said weight having a tail to engage the plunger 1 when necessary to drain the pump. The valve is held in place by an expansion ring 20 which is seated in an annular groove 21 at the junction of the side wall of the chamber 16 with the bottom. This ring provides also the hinge for the valve. The chamber 16 is the suction chamber, and the annular chamber encircling the same between said chamber 16 and the wall or casing 1 is the vacuum chamber, and that portion of the casing 1 above the partition 13 is the overflow chamber.

In operation, when the plunger is lifted the liquid flows past the valve 18 into the suction chamber. When the plunger is depressed the liquid in the vacuum chamber encircling the suction chamber rises. Thus the liquid in the outer or vacuum chamber rises and falls, giving a cushioning effect, relieving sudden jar and making comfortable working conditions for the operator.

After priming, the plunger exhausts air in the vacuum chamber until the fluid reaches the valve. The momentum created causes water to rise in the vacuum chamber assisted by the atmospheric pressure. There is no appreciable amount of air in the vacuum chamber when the pump is in use. This lack of air furnishes a non-conductor for heat and cold, as in thermos bottles, and provides protection against freezing.

The other portions of the pump where the fluid comes in contact with the external wall of the casing have the natural advantage of an up and down circulation which protects against freezing. The valve in the vacuum chamber is opened by lifting the handle at its outer end to its highest point. The bottom of the sucker flange of the plunger engages the tail and lifts the valve. The raising of the handle to its limit is done only to drain the pump.

I claim:

A pump comprising a casing having a vacuum chamber adapted to be connected with the water supply pipe, and having a central axially arranged suction chamber at the center of the vacuum chamber, said suction chamber having a port in its bottom communicating with the vacuum chamber, and a valve coöperating with the port, said valve being normally held slightly open.

GEORGE ERNEST HASZINGER.

Copies of this patent may be obtained for five cents each, by addressing the "Commissioner of Patents, Washington, D. C."